US010680269B2

(12) United States Patent
Brinkmeier et al.

(10) Patent No.: US 10,680,269 B2
(45) Date of Patent: Jun. 9, 2020

(54) VARIABLY SEGMENTED FUEL CELL STACK, AND FUEL CELL SYSTEM AND VEHICLE COMPRISING SAME

(71) Applicants: Volkswagen AG, Wolfsburg (DE); Audi AG, Ingolstadt (DE)

(72) Inventors: Jan-Philipp Brinkmeier, Braunschweig (DE); Dirk Jenssen, Braunschweig (DE)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 97 days.

(21) Appl. No.: 15/751,420

(22) PCT Filed: Aug. 10, 2016

(86) PCT No.: PCT/EP2016/069027
§ 371 (c)(1),
(2) Date: Feb. 8, 2018

(87) PCT Pub. No.: WO2017/025558
PCT Pub. Date: Feb. 16, 2017

(65) Prior Publication Data
US 2018/0233764 A1 Aug. 16, 2018

(30) Foreign Application Priority Data
Aug. 13, 2015 (DE) .................. 10 2015 215 497

(51) Int. Cl.
*H01M 8/24* (2016.01)
*H01M 8/2465* (2016.01)
(Continued)

(52) U.S. Cl.
CPC ............... *H01M 8/24* (2013.01); *B60L 50/72* (2019.02); *H01M 8/0258* (2013.01); *H01M 8/04089* (2013.01); *H01M 8/0494* (2013.01); *H01M 8/241* (2013.01); *H01M 8/249* (2013.01); *H01M 8/2465* (2013.01); *B60L 1/003* (2013.01);
(Continued)

(58) Field of Classification Search
CPC .... H01M 8/24; H01M 8/0258; H01M 8/0494; H01M 8/241; H01M 8/04089; H01M 8/249; H01M 8/2465; H01M 2250/20; B60L 50/72; B60L 50/51; B60L 58/40; B60L 1/003; Y02T 90/32
See application file for complete search history.

(56) References Cited

U.S. PATENT DOCUMENTS

| 2003/0207165 A1* | 11/2003 | Skala ............... H01M 8/04089 429/444 |
| 2004/0043279 A1* | 3/2004 | Rapaport ............ H01M 8/0258 429/455 |
| 2012/0141890 A1* | 6/2012 | Seo ................... H01M 8/04201 429/414 |

FOREIGN PATENT DOCUMENTS

| DE | 10 2012 218646 A1 | 4/2014 |
| EP | 2 122 737 A1 | 11/2009 |
(Continued)

*Primary Examiner* — Michael L Dignan
(74) *Attorney, Agent, or Firm* — Seed Intellectual Property Law Group LLP

(57) ABSTRACT

The invention relates to a fuel cell stack having at least two segments of individual fuel cells arranged in parallel in terms of fluid, said segments being arranged in series relative to one another in terms of fluid. It is provided that the fuel cell stack is set up to vary the number of individual fuel cells in at least one segment.

12 Claims, 2 Drawing Sheets

Figure 1:
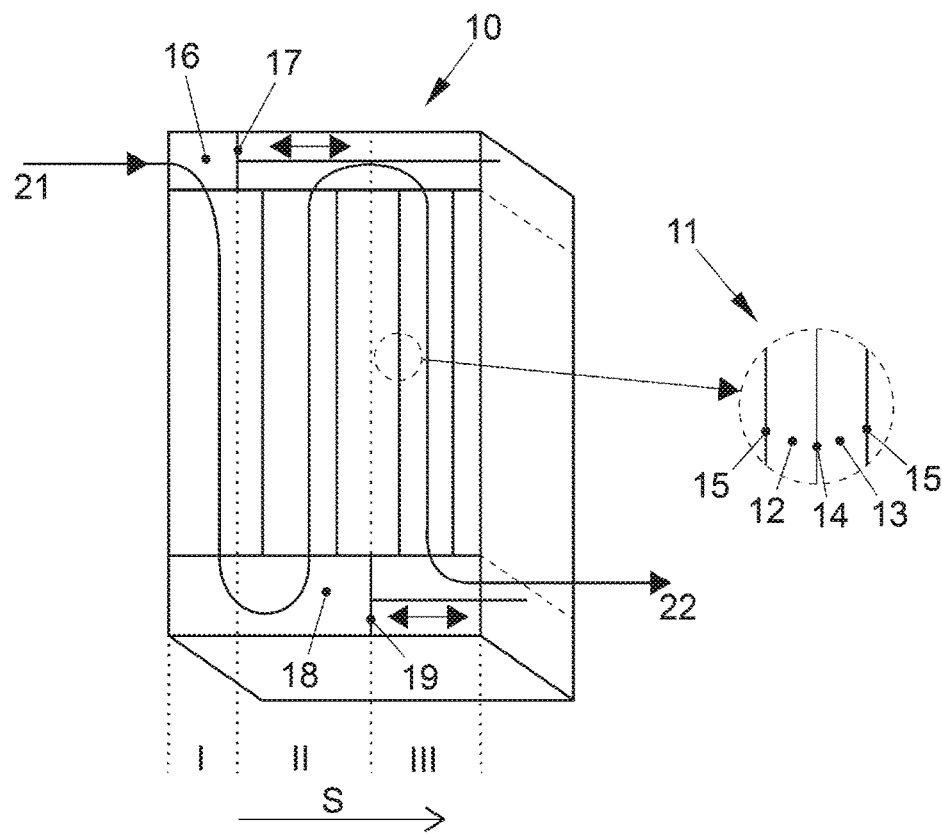

(51) Int. Cl.
*H01M 8/04089* (2016.01)
*H01M 8/249* (2016.01)
*H01M 8/241* (2016.01)
*B60L 50/72* (2019.01)
*H01M 8/0258* (2016.01)
*H01M 8/04828* (2016.01)
*B60L 50/51* (2019.01)
*B60L 58/40* (2019.01)
*B60L 1/00* (2006.01)

(52) U.S. Cl.
CPC ............... *B60L 50/51* (2019.02); *B60L 58/40* (2019.02); *H01M 2250/20* (2013.01); *Y02T 90/32* (2013.01)

(56) References Cited

FOREIGN PATENT DOCUMENTS

| | | | | |
|---|---|---|---|---|
| JP | 2003 157864 A | 5/2003 | | |
| WO | WO2008101921 | * | 8/2008 | .............. H01M 8/24 |

* cited by examiner

VARIABLY SEGMENTED FUEL CELL STACK, AND FUEL CELL SYSTEM AND VEHICLE COMPRISING SAME

The invention relates to a fuel cell stack having at least two segments of individual fuel cells arranged in parallel in terms of fluid, said segments being arranged in series relative to one another in terms of fluid, characterized in that the fuel cell stack is set up to vary the number of individual fuel cells in at least one segment.

Fuel cells use the chemical conversion of a fuel with oxygen into water in order to generate electrical energy. For this purpose, fuel cells contain as a core component what is known as the membrane electrode assembly (MEA), which is an arrangement of an ion-conducting (usually proton-conducting) membrane and in each case a catalytic electrode (anode and cathode) arranged on each side of the membrane. The latter generally comprise supported precious metals, in particular platinum. In addition, gas diffusion layers (GDL) can be arranged on both sides of the membrane electrode assembly on the sides of the electrodes facing away from the membrane. Generally, the fuel cell is formed by a plurality of MEAs arranged in the stack, the electrical power outputs of which add up. Between the individual membrane electrode assemblies, bipolar plates (also called flux field plates) are usually arranged, which ensure a supply of the individual cells with the operating media, i.e. the reactants, and are usually also used for cooling. In addition, the bipolar plates ensure an electrically conductive contact to the membrane electrode assemblies.

During operation of the fuel cell, the fuel, especially hydrogen $H_2$ or a gas mixture containing hydrogen, is supplied to the anode over an open flux field of the bipolar plate on the anode side, where electrochemical oxidation of $H_2$ to $H^+$ with loss of electrons takes place. A transport of the $H^+$ protons from the anode chamber into the cathode chamber is effected via the electrolytes or the membrane, which separates the reaction chambers from each other in a gas-tight and electrically insulated manner (in a water-bound or water-free manner). The electrons provided at the anode are guided to the cathode via an electrical line. The cathode receives oxygen or a gas mixture containing oxygen (such as air) via an open flux field of the bipolar plate on the cathode side, so that a reduction of $O_2$ to 2 $O^{2-}$ with uptake of electrons takes place. At the same time, the oxygen anions react in the cathode chamber with the protons transported via the membrane to form water.

Typically, a plurality of individual fuel cells is assembled into a fuel cell stack in order to increase the power of the fuel cell system. The individual fuel cells are hereby electrically connected with one another in series. In order to supply the fuel cell stack with operating media, operating medium channels pervade the individual fuel cells in the stack direction. More precisely, for each operating medium two operating medium channels are provided that are in fluid connection via the individual fuel cells. One operating medium channel supplies the individual fuel cells with the operating medium, and an operating medium channel that is typically arranged parallel thereto conducts the reaction product and/or unconverted operating medium away from the supplied individual fuel cells.

So that sufficient operating media, for example anode gas or cathode gas, are provided to the fuel cell system at each operating point, the fuel cell system may be operated with an excess of anode gas or cathode gas. This avoids an undersupply of individual fuel cells and ensures a stable operation. Current fuel cell systems are therefore operated with an excess of anode gas or cathode gas. For example, such an overstoichiometric supply may be realized with a recirculation blower. However, the system efficiency is not optimal due to the increased loss of operating medium.

What is known as a cascade has proven itself for the use of the operating medium discharged from the fuel, in which cascade the respective operating media flow through multiple cascade stages in succession, said stages having a decreasing number of fuel cells connected in parallel at the gas side. Via the cascade, unused operating medium from the first cascade stage is fed into the second cascade stage and largely consumed there. The residual operating medium is fed into the third cascade stage, which contains even fewer fuel cells, and so forth. A good level of utilization of the operating medium employed may hereby be achieved. DE 103 93 164 B4, EP 1 577 972 B1 and EP 2 122 737 B1 describe fuel cell systems of the same type.

For a given cascade, the stoichiometry resulting in the respective cascade stages is essentially dependent on the stoichiometry entering from the outside into the first cascade stage (=global stoichiometry). If the stoichiometry of an arbitrary cascade stage (=local stoichiometry) should be increased, the global stoichiometry must be increased, whereby the stoichiometry of all cascade stages increases. The efficiency of the fuel cell system is in turn thereby reduced. Depending on the operating state, given such fuel cell systems it would therefore be desirable to vary the stoichiometry of one cascade stage independently of the stoichiometry of another cascade stage.

The invention is now based on the object of proposing a fuel cell stack that remedies the problems of the prior art at least in part. In particular, an optimal system efficiency should be achieved in each operating state, and only a small proportion of operating media should be released unconsumed to the environment.

This object is achieved by a fuel cell stack, as well as by a correspondingly set-up fuel cell system and a corresponding vehicle with the features of the independent claims.

A first aspect of the invention thus relates to a fuel cell stack having at least two stack segments that are arranged in series with one another in terms of fluid. Within a stack segment, the individual fuel cells are arranged in parallel in terms of fluid. Via the segmentation, the partially unconsumed operating medium is fed from the first cascade stage into the second cascade stage and is further consumed there. According to the invention, the fuel cell stack is set up to vary the number of individual fuel cells in at least one stack segment, and preferably in all stack segments. An optimal efficiency may thereby be achieved. In order to optimally cover additional operating states, it is provided that the fuel cell stack is also set up to vary the number of stack segments.

In a preferred embodiment of the invention, the fuel cell stack has a first operating medium channel (at the intake side, in terms of operating medium) and a second operating medium channel preferably running essentially parallel to said first operating medium channel. Both operating medium channels extend through the individual fuel cells along the stack direction and are in fluid connection with each other across the individual fuel cells. According to the invention, in the first operating medium channel at least one fluid barrier is arranged that interrupts the operating medium flow through the first operating medium channel between two adjacent individual fuel cells, and whose position may be varied in the stack direction. The stack segment adjoining the start of the stack is bounded by the start of the stack and the fluid barrier arranged adjacent to the start of the stack in the first operating medium channel. Inner stack segments are bounded by two adjacent fluid barriers arranged in the first and second operating medium channel. The stack segments adjoining the end of the stack are bounded by the end of the stack and the fluid barrier arranged adjacent to the end of the stack in the operating medium channel at the output side, in terms of operating medium.

In order to obtain more than two segments, additional fluid barriers that can be moved in the stack direction are arranged in the first and/or second operating medium channel. A subdivision into three variable segments is achieved via a fluid barrier that can be moved in the stack direction, which fluid barrier is arranged in the second operating medium channel and interrupts the operating medium flow through the second operating medium channel between two adjacent individual fuel cells. It is also provided that the fluid barriers are designed so as to be movable independently of one another in the stack direction in order to be able to optimally cover all operating points.

In order to use all individual fuel cells of the fuel cell stack, in a further preferred embodiment of the invention the fluid barriers are arranged alternatingly in the stack direction in the first and second operating medium channels, meaning that they are in positions that deviate or are offset from one another.

In operation, the individual fuel cells of the first segment are charged with fresh operating medium at the input side, in terms of operating medium. The unconverted residual operating medium flows from the individual fuel cells into the opposite operating medium channel at the input side, in terms of operating medium, and serves to supply the individual fuel cells of the second segment. After conversion of the residual operating medium in the second segment, remaining residual operating medium flows from the individual cells of the second segment into the operating medium channel at the input side, in terms of operating medium, and may serve to supply an additional segment, etc. A serpentine operating medium flow through the fuel cell stack thereby results. While in conventional fuel cell stacks one of the operating medium channels serves to supply the operating medium and the other serves to discharge said operating medium, in the fuel cell stack according to the invention the two functions are distributed among both operating medium channels.

An additional aspect of the invention relates to a fuel cell system comprising the fuel cell stack described here, and a control device that is set up to vary the number of individual fuel cells of at least one segment depending on the operating state of the fuel cell system. Both the number of segments and the number of individual fuel cells in the segments are preferably controlled by the control device.

An additional aspect of the invention relates to a vehicle having such a fuel cell system, or having the fuel cell stack described here. It is preferably a vehicle that has an electric motor as a traction motor with which the vehicle is powered, either solely or in combination with a combustion engine.

Additional preferred embodiments of the invention arise from the remaining features cited in the dependent claims.

The various embodiments of the invention mentioned in this application may be combined advantageously with one another unless stated otherwise in individual cases.

Figure 2:
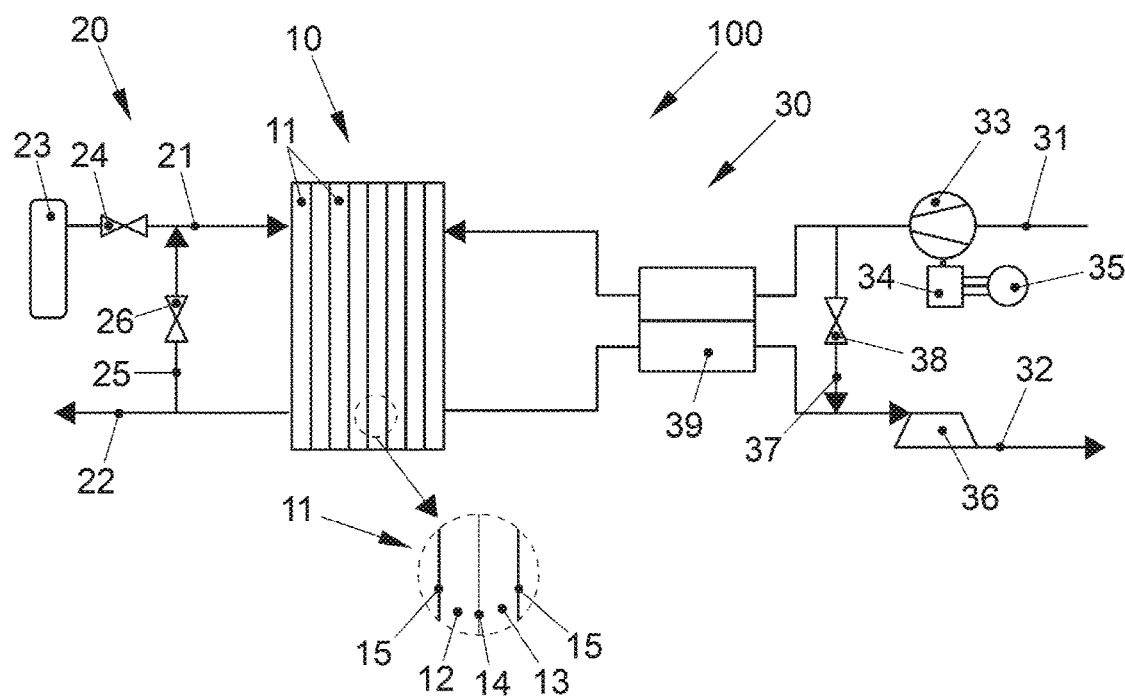

The invention is explained below in exemplary embodiments in reference to the associated drawings. The following is shown:

FIG. 1 a fuel cell stack according to a preferred embodiment of the invention;

FIG. 2 a fuel cell system according to a preferred embodiment of the invention; and FIG. 1 shows a fuel cell stack 10 according to a preferred embodiment of the invention, which fuel cell stack 10 is here subdivided into the segments I, II, III by two plunger-shaped fluid barriers 17, 19. The stack segment I adjoining the start of the stack is bounded by the start of the stack and the fluid barrier 17 arranged adjacent to the start of the stack in the first anode gas channel 16. The inner stack segment II is bounded by two adjacent fluid barriers 17, 19 arranged in the first and second anode gas channels 16, 18. The stack segment III adjoining the end of the stack is bounded by the end of the stack and the fluid barrier 19 arranged adjacent to the end of the stack in the anode gas channel 18, at the output side in terms of the operating medium.

Each stack segment I, II, III has as a core component a plurality of individual fuel cells 11 (not shown) arranged in stack form. Each individual fuel cell 11 comprises an anode chamber 12 as well as a cathode chamber 13 which are separated from one another by an ion-conductive polymer electrolyte membrane 14 (see detail section from FIGS. 1 and 2). The anode chamber and cathode chamber 12, 13 in each case comprise a catalytic electrode, the anode or the cathode, which catalyzes the respective partial reaction of the fuel cell conversion. The anode electrode and cathode electrode have a catalytic material, for example platinum, which is supported on an electrically conductive carrier material with a large specific surface, for example a carbon-based material. Also arranged between two such membrane electrode assemblies is a bipolar plate, indicated by 15, which serves to supply the operating media in the cathode and anode chambers 12, 13 and also establishes the electrical connection between the individual fuel cells 11.

Two anode gas channels 16, 18 that are essentially parallel to one another extend through the fuel cell stack 10 in the stack direction S and are in fluid connection with one another across the individual fuel cells 11 in order to supply the individual fuel cells 11 with anode gas of the anode gas supply 21, and to feed the unconsumed anode gas into the anode exhaust gas path 22. Stated more precisely, the anode gas channel 16 serves to supply the stack segments I and III with anode gas, in particular hydrogen. The second anode gas channel 18 serves to supply the stack segment II with the anode gas that was not consumed in segment I, and to carry away the anode gas that is not consumed in segment III.

Designated by S in FIG. 1 is the stack direction of both the individual fuel cells 11 within a fuel cell segment I, II, III and of the three fuel cell segments I, II, III within the fuel cell stack 10. The stack direction S of the individual fuel cells 11 thus corresponds to that of the fuel cell segments I, II, III.

A plunger-shaped fluid barrier 17, 19 is arranged in the operating medium channels 16, 18 respectively, which fluid barrier fills the cross sections of the operating medium channels 16, 18 and plugs them fluid-tight so that a passage of the operating medium is prevented. It is thereby provided that the head of the fluid barriers 17, 19 is sufficiently flat so that, if it is situated between two adjoining individual fuel cells, it does not plug these. Both fluid barriers 17, 19 may be displaced independently of one another via movement of the plunger in the stack direction. The fluid barriers 17, 19 are thereby alternately arranged in the stack direction in the first anode gas channel 16 and in the second anode gas channel 18.

In operation, the individual fuel cells 11 of the segment I are charged with fresh anode gas, for example hydrogen, at the input side in terms of operating medium. The unconverted residual anode gas collects in the opposite anode gas channel 18, at the input side in terms of the operating medium, and serves to supply the individual fuel cells 11 of the segment 11. After conversion of the residual anode gas in segment II, the remaining residual anode gas accumulates in the input-side anode gas channel 16, in terms of operating medium, and serves to supply segment III. After the residual anode gas flows through segment III, this is supplied to the anode exhaust gas path 22. Overall, a serpentine anode gas flow through the fuel cell stack results.

The cathode supply 30 comprises a cathode supply path 31 which supplies an oxygen-containing cathode operating medium to the cathode chambers 13 of the fuel cell stack 10, in particular air which is sucked in from the environment. The cathode supply 30 also comprises a cathode exhaust path 32, which discharges the cathode exhaust gas (in particular the exhaust air) from the cathode chambers 13 of the fuel cell stack 10 and supplies it, if appropriate, to an exhaust system (not shown).

A compressor 33 is arranged in the cathode supply path 31 for conveying and compressing the cathode operating medium. In the embodiment shown, the compressor 33 is designed as a compressor which is driven mainly by an electric motor, the drive of which is effected via an electric motor 34 equipped with a corresponding power electronics system 35. The compressor 33 may also be driven by a turbine 36 (optionally with variable turbine geometry) disposed in the cathode exhaust path 32 via a common shaft (not shown). The turbine 36 represents an expander which produces an expansion of the cathode exhaust gas, and thus brings about a decrease in its pressure.

In accordance with the illustrated embodiment, the cathode supply 30 can also have a wastegate line 37 which connects the cathode supply line 31 to the cathode exhaust line 32, i.e., represents a bypass of the fuel cell stack 10. The wastegate line 37 allows the operating pressure of the operating pressure of the cathode operating medium to be temporarily reduced in the fuel cell stack 10 without shutting down the compressor 33. An actuating means 38 arranged in the wastegate line 37 allows a control of the amount of the cathode operating medium bypassing the fuel cell stack 10. All actuating means 24, 26, 38 of the fuel cell system 100 may be designed as controllable or non-controllable valves or flaps. Corresponding additional actuating means may be arranged in the lines 21, 22, 31 and 32 in order to be able to isolate the fuel cell stack 10 from the environment.

FIG. 2 shows a fuel cell system, denoted overall by 100, according to a preferred embodiment of the present invention. The fuel cell system 100 is part of a vehicle (not shown), in particular an electric vehicle, which has an electric traction motor, which is supplied with electrical energy by the fuel cell system 100.

The reference character 10 designates a fuel cell stack according to the invention that is provided as a core component in the fuel cell system 100. For example, 10 designates the fuel cell stack depicted in FIG. 1.

In order to supply the fuel cell stack 10 with the operating gases, it has on the one hand an anode supply 20 and on the other hand a cathode supply 30.

The anode supply 20 comprises an anode supply path 21, which serves to supply an anode operating medium (fuel), for example hydrogen, to the anode chambers 12 of the fuel cell stack 10. For this purpose, the anode supply path 21 connects a fuel reservoir 23 with an anode inlet of the fuel cell stack 10. The anode supply 20 also comprises an anode exhaust path 22 which discharges the anode exhaust gas from the anode chambers 12 via an anode outlet of the fuel cell stack 10. The anode operating pressure on the anode sides 12 of the fuel cell stack 10 is adjustable via an actuating means 24 in the anode supply path 21. As shown, the anode supply 20 may moreover have a fuel recirculation line 25 which connects the anode exhaust path 22 to the anode supply path 21. The recirculation of fuel is customary in order to return the mostly over-stoichiometric supplied fuel to the stack and to use it. An additional actuating means 26 with which the recirculation rate is adjustable is arranged in the fuel recirculation line 25.

The cathode supply 30 comprises a cathode supply path 31 which supplies an oxygen-containing cathode operating medium to the cathode chambers 13 of the fuel cell stack 10, in particular air which is sucked in from the environment. The cathode supply 30 also comprises a cathode exhaust path 32, which discharges the cathode exhaust gas (in particular the exhaust air) from the cathode chambers 13 of the fuel cell stack 10 and supplies it, if appropriate, to an exhaust system (not shown).

A compressor 33 is arranged in the cathode supply path 31 for conveying and compressing the cathode operating medium. In the embodiment shown, the compressor 33 is designed as a compressor which is driven mainly by an electric motor, the drive of which is effected via an electric motor 34 equipped with a corresponding power electronics system 35. The compressor 33 may also be driven by a turbine 36 (optionally with variable turbine geometry) disposed in the cathode exhaust path 32 via a common shaft (not shown). The turbine 36 represents an expander which produces an expansion of the cathode exhaust gas, and thus brings about a decrease in its pressure.

The fuel cell system 100 also has a humidifier module 39. The humidifier module 39 is arranged in the cathode supply path 31 on the one hand so that the cathode operating gas can flow through it. On the other hand, the arrangement in the cathode exhaust path 32 allows the cathode exhaust gas to flow through it. The humidifier 39 typically has a plurality of membranes permeable by water vapor which are designed to be either flat or in the form of hollow fibers. In this case, the comparatively dry cathode operating gas (air) flows over one side of the membranes and the comparatively moist cathode exhaust gas (exhaust gas) flows over the other side. Driven by the higher partial pressure of the water vapor in the cathode exhaust gas, water vapors pass over the membrane into the cathode operating gas, which is moistened in this way.

Various further details of the anode supply and cathode supply 20, 30 are not shown in the simplified FIG. 2 for reasons of clarity. For example, a water separator can be installed in the anode and/or cathode exhaust path 22, 32 in order to condense and drain product water arising from the fuel cell reaction. Finally, the anode exhaust gas line 22 can merge into the cathode exhaust gas line 32 so that the anode exhaust gas and the cathode exhaust gas are discharged via a common exhaust gas system.

Figure 3:
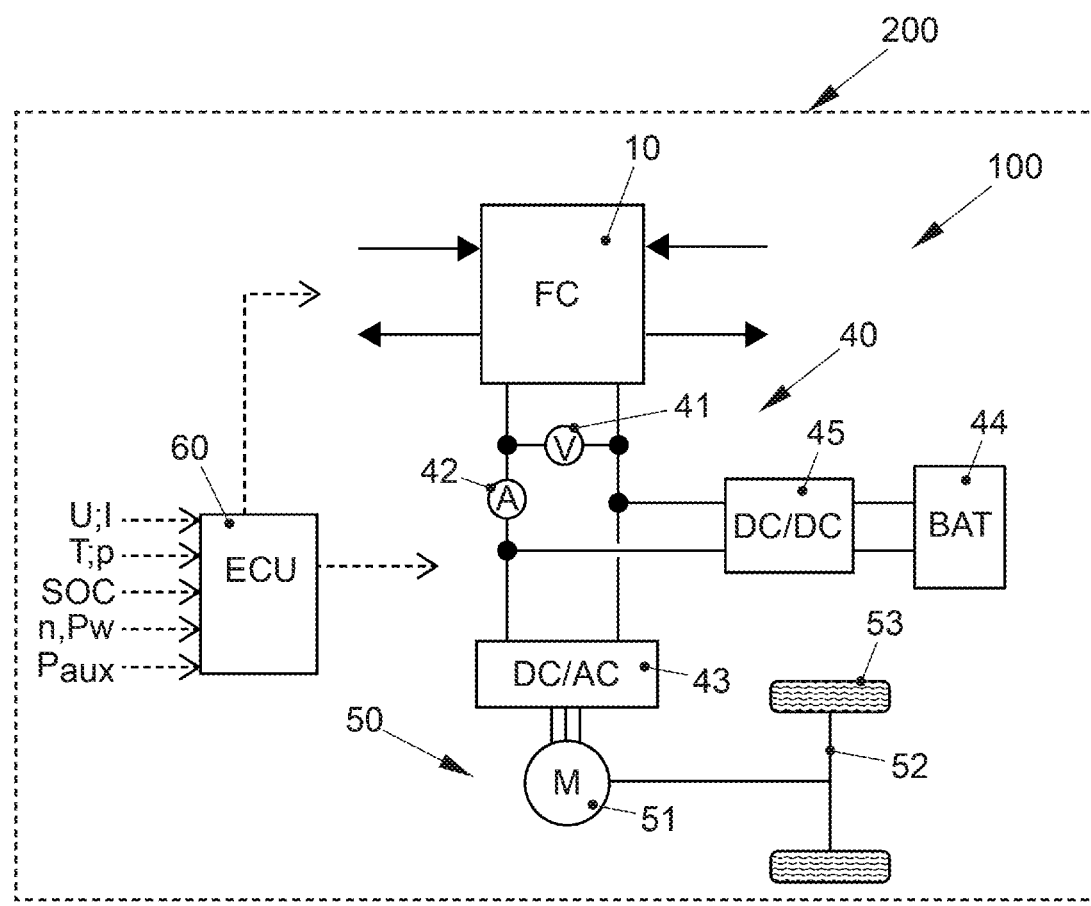

FIG. 3 shows a vehicle, denoted overall by 200, which has the fuel cell system 100 from FIG. 2, an electrical power system 40, a vehicle drive system 50, and an electronic control device 60.

The electronic power system 40 comprises a voltage sensor 41 for detecting a voltage generated by the fuel cell stack 10, and a current sensor 42 for detecting a current generated by the fuel cell stack 10. The electronic power system 40 further comprises an energy storage unit 44, for example a high-voltage battery or a capacitor. The energy storage unit 44 is connected with the power grid via a transformer 45, in particular a high-voltage direct current transformer. In the same or a similar manner, the fuel cell system itself—its electrical loads, for example the electric motor 34 of the compressor 33 (see FIG. 1)—may be connected with the power grid or other electrical loads of the vehicle, for example a compressor for an air-conditioning unit or the like.

The drive system 50 comprises an electric motor 51, which serves as traction motor of the vehicle 200. To this end, the electric motor 51 drives a drive axle 52 with drive wheels 53 arranged thereon. The traction motor 51 is connected via an inverter 43 to the electronic power system 40 of the fuel cell system 100 and constitutes the main electrical consumer of the system.

The electronic control device 60 controls the operation of the fuel cell system 100, in particular its anode supply and cathode supply 20, 30 as well as the position of the fluid barriers 17, 19 in the anode gas channels 16, 18, its electrical power system 40 and the traction motor 51. For this purpose, the control device 60 receives different input signals, for example the present position of the fluid barriers 17, 19 in the anode gas channels 16, 18; the voltage U of the fuel cell 10, detected with the voltage sensor 41; the current I of the fuel cell stack 10, detected using the current sensor 42; information about the temperature T of the fuel cell stack 10; the pressures p in the anode chamber and/or cathode chamber 12, 13; the charge state SOC of the energy storage unit 44; the rotational speed n of the traction motor 51; and other input variables. In particular, a driving power $P_W$ requested by a driver of the vehicle 200 appears as an additional input variable. The latter variable is in particular detected via a pedal sensor from the force used to operate an accelerator pedal (not shown here). Requested powers $P_{aux}$ of the additional electrical loads of the vehicle 200 may also arrive at the control device 60.

The control device 60 determines a total requested power of the fuel cell stack 10 depending on the input variables, in particular from the sum of the requested driving power $P_W$ and the powers $P_{aux}$ requested by the secondary loads. From this, from calculations or corresponding stored characteristic fields the control device determines the optimal position of the fluid barriers 17, 19 in the anode gas channels 16, 18, the required mass flows or operating pressures of the anode operating medium and cathode operating medium, and controls the electric motor 34 of the compressor 33 as well as the actuating means 24, 26, 38 etc. of the fuel cell system 100. In addition to this, the control device 60 controls the inverter 43 in order to supply energy to the traction motor 51, as well as the transformer 45 and possibly other transformers, in order to charge or discharge the energy storage unit 44 and to supply energy to the loads connected to the power network.

LIST OF REFERENCE SYMBOLS

100 Fuel cell system
200 Vehicle
10 Fuel cell stack
11 Individual (fuel) cell
12 Anode chamber
13 Cathode chamber
14 Polymer electrolyte membrane
15 Bipolar plate
16 First operating medium channel/first anode gas channel
17 Fluid barrier
18 Second operating medium channel/second anode gas channel
19 Fluid barrier
20 Anode supply
21 Anode supply path
22 Anode exhaust path
23 Fuel tank
24 Actuating means
25 Fuel recirculation line
26 Actuating means
30 Cathode supply
31 Cathode supply path
32 Cathode exhaust path
33 Compressor
34 Electric motor
35 Power electronics
36 Turbine
37 Wastegate line
38 Actuating means
39 Humidifier module
40 Electrical power system
41 Voltage sensor
42 Current sensor
43 Inverter
44 Energy storage unit/battery
45 Direct current transformer
50 Drive system
51 Traction motor
52 Drive axle
53 Drive wheels
60 Control device

The invention claimed is:

1. A fuel cell stack comprising:
   at least two stack segments of individual fuel cells arranged in parallel with respect to fluid flow, said stack segments being arranged in series relative to one another with respect to fluid flow, wherein the fuel cell stack is set up to vary a number of individual fuel cells in at least one stack segment; and
   a first operating medium channel and a second operating medium channel in fluid connection with each other via the individual fuel cells, said operating medium channels penetrating the individual fuel cells and extending along a stack direction;
   wherein, in the first operating medium channel, at least one plunger is arranged that can be moved in the stack direction to vary the number of individual fuel cells in the at least one stack segment, which plunger is configured to interrupt an operating medium flow through the first operating medium channel between two adjacent individual fuel cells at a plurality of locations along a range of motion of the at least one plunger in the stack direction.

2. The fuel cell stack according to claim 1, wherein the fuel cell stack includes a plurality of plungers, the plungers being moveable in the stack direction to vary a number of stack segments.

3. The fuel cell stack according to claim 1, wherein another plunger that can be moved in the stack direction is arranged in the second operating medium channel, which plunger interrupts the operating medium flow through the second operating medium channel between two adjacent individual fuel cells.

4. The fuel cell stack according to claim 3 wherein the plungers are designed so as to be movable independently of one another in the stack direction.

5. The fuel cell stack according to claim 3 wherein the plungers are arranged alternately in the stack direction in the first and second operating medium channels.

6. The fuel cell stack according to claim 1 wherein at least one of the said operating medium channels is connected with an anode supply.

7. A fuel cell system comprising:
a fuel cell stack including at least two stack segments of individual fuel cells arranged in parallel with respect to fluid flow, said stack segments being arranged in series relative to one another with respect to fluid flow, wherein the fuel cell stack is set up to vary a number of individual fuel cells in at least one stack segment;
a first operating medium channel and a second operating medium channel in fluid connection with each other via the individual fuel cells, said operating medium channels penetrating the individual fuel cells and extending along a stack direction;
wherein, in the first operating medium channel, at least one plunger is arranged that can be moved in the stack direction to vary the number of individual fuel cells in the at least one stack segment, which plunger is configured to interrupt an operating medium flow through the first operating medium channel between two adjacent individual fuel cells at a plurality of locations along a range of motion of the at least one plunger in the stack direction; and
a control device, which control device is set up to vary the number of individual fuel cells of at least one stack segment depending on an operating state of the fuel cell system.

8. The fuel cell system of claim 7 wherein the fuel cell stack includes a plurality of plungers, the plungers being moveable in the stack direction to vary a number of stack segments.

9. A vehicle comprising:
a fuel cell stack including at least two stack segments of individual fuel cells arranged in parallel with respect to fluid flow, said stack segments being arranged in series relative to one another with respect to fluid flow, wherein the fuel cell stack is set up to vary a number of individual fuel cells in at least one stack segment; and
a first operating medium channel and a second operating medium channel in fluid connection with each other via the individual fuel cells, said operating medium channels penetrating the individual fuel cells and extending along a stack direction;
wherein, in the first operating medium channel, at least one plunger is arranged that can be moved in the stack direction to vary the number of individual fuel cells in the at least one stack segment, which plunger is configured to interrupt an operating medium flow through the first operating medium channel between two adjacent individual fuel cells at a plurality of locations along a range of motion of the at least one plunger in the stack direction.

10. The vehicle of claim 9 wherein the fuel cell stack includes a plurality of plungers, the plungers being moveable in the stack direction to vary a number of stack segments.

11. A vehicle comprising a fuel cell system, the fuel cell system including:
a fuel cell stack including at least two stack segments of individual fuel cells arranged in parallel with respect to fluid flow, said stack segments being arranged in series relative to one another with respect to fluid flow, wherein the fuel cell stack is set up to vary a number of individual fuel cells in at least one stack segment;
a first operating medium channel and a second operating medium channel in fluid connection with each other via the individual fuel cells, said operating medium channels penetrating the individual fuel cells and extending along a stack direction;
wherein, in the first operating medium channel, at least one plunger is arranged that can be moved in the stack direction to vary the number of individual fuel cells in the at least one stack segment, which plunger is configured to interrupt an operating medium flow through the first operating medium channel between two adjacent individual fuel cells at a plurality of locations along a range of motion of the at least one plunger in the stack direction; and
a control device, which control device is set up to vary the number of individual fuel cells of the at least one stack segment depending on an operating state of the fuel cell system.

12. The vehicle of claim 11 wherein the fuel cell stack includes a plurality of plungers, the plungers being moveable in the stack direction to vary a number of stack segments.

* * * * *